US006725988B2

(12) United States Patent
Bauer et al.

(10) Patent No.: US 6,725,988 B2
(45) Date of Patent: Apr. 27, 2004

(54) HYDRODYNAMIC CLUTCH DEVICE

(75) Inventors: Thomas Bauer, Grossbardof (DE);
Peter Frey, Gerolzhofen (DE); Rüdiger Hinkel, Röthlein-Heidenfeld (DE);
Sven Koepke, Rieden (DE); Ralf Rönnebeck, Schonungen-Forst (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/264,211

(22) Filed: Oct. 3, 2002

(65) Prior Publication Data

US 2003/0029685 A1 Feb. 13, 2003

Related U.S. Application Data

(62) Division of application No. 09/764,704, filed on Jan. 18, 2001, now abandoned.

(30) Foreign Application Priority Data

Jan. 19, 2000 (DE) .......................................... 100 01 906

(51) Int. Cl.[7] .............................................. F16H 45/02
(52) U.S. Cl. .................... 192/3.29; 192/70.18; 192/200
(58) Field of Search ................. 192/3.29, 3.3, 192/70.18, 200; 267/158, 161, 163; 464/98

(56) References Cited

U.S. PATENT DOCUMENTS

| | | | | |
|---|---|---|---|---|
| 3,762,516 A | * | 10/1973 | Matsushita | ............... 192/84.94 |
| 4,353,444 A | | 10/1982 | Bionaz | |
| 5,221,232 A | * | 6/1993 | Nameny | ...................... 464/98 |
| 5,462,145 A | | 10/1995 | Gimmler | |
| 5,799,762 A | | 9/1998 | Hinkel et al. | |
| 5,826,690 A | | 10/1998 | Maingaud et al. | |
| 5,964,329 A | | 10/1999 | Kawaguchi et al. | |
| 6,123,177 A | | 9/2000 | Arhab | |

FOREIGN PATENT DOCUMENTS

| | | | |
|---|---|---|---|
| DE | 195 81 383 | 3/1997 | |
| DE | 199 04 023 | 8/1999 | |
| DE | 199 10 049 | 9/1999 | |
| DE | 198 80 709 | 11/1999 | |
| DE | 299 11 867 | 12/1999 | |
| JP | 57-51056 | 3/1982 | |
| WO | WO 97/42432 A1 | * 11/1997 | ........... F16H/45/02 |
| WO | WO 00/03158 | 1/2000 | |

* cited by examiner

Primary Examiner—Richard M. Lorence
(74) Attorney, Agent, or Firm—Cohen, Pontani, Lieberman & Pavane

(57) ABSTRACT

A hydrodynamic clutch device, particularly a hydrodynamic torque converter or fluid coupling, comprises a housing arrangement, a turbine wheel which is arranged in the housing arrangement so as to be rotatable with respect to the housing arrangement about an axis of rotation, a lockup clutch arrangement by means of which a torque-transmitting connection can be selectively produced between the housing arrangement and the turbine wheel, wherein the lockup clutch arrangement comprises a clutch element which is connected by a connection arrangement to the housing arrangement so as to be substantially fixed with respect to rotation but axially displaceable relative to it, wherein the connection arrangement comprises at least one elastically deformable connection element which is fixedly connected with the housing arrangement on the one hand and with the clutch element on the other hand. It is provided that the at least one connection element is connected with the housing arrangement in an area between surfaces of a housing element and of a housing huh element which is fixedly connected with the housing element, wherein these surfaces face one another.

10 Claims, 10 Drawing Sheets

HYDRODYNAMIC CLUTCH DEVICE

CROSS-REFERENCE TO RELATED APPLICATION(S)

This application is a Divisional of U.S. patent application Ser. No. 09/764,704, filed Jan. 18, 2001 now abandoned.

BACKGROUND OF THE INVENTION

1. Field of the Invention

The invention is directed to a hydrodynamic clutch device, particularly a hydrodynamic torque converter or fluid coupling, comprising a housing arrangement, a turbine wheel which is arranged in the housing arrangement so as to be rotatable with respect to the housing arrangement about an axis of rotation, a lockup clutch arrangement by means of which a torque-transmitting connection can be selectively produced between the housing arrangement and the turbine wheel, wherein the lockup clutch arrangement comprises a clutch element which is connected by a connection arrangement to the housing arrangement so as to be substantially fixed with respect to rotation but axially displaceable relative to it, wherein the connection arrangement comprises at least one elastically deformable connection element which is fixedly connected with the housing arrangement on the one hand and with the clutch element on the other hand.

2. Description of the Related Art

DE 195 81 383 T1 discloses a hydrodynamic clutch device in which a clutch component of a lockup clutch arrangement, that is, for example, a clutch piston, is arranged on a housing hub element such that its radial inner area is movable axially, particularly in a tight manner. In the radial central area, a connection arrangement produces a driving connection between a housing cover of the housing arrangement and the clutch element so as to prevent relative rotation between the housing cover and clutch element. For this purpose, an elastic connection element which is constructed in all approximately ring-shaped manner is provided, wherein individual connection arm portions of this elastic connection element project radially inward and in circumferential direction. In the area of the connection arm portions, a connection is provided to the clutch element by riveting and a rivet connection to the housing cover is provided in the area of body portions located therebetween.

SUMMARY OF THE INVENTION

It is the object of the present invention to provide a hydrodynamic clutch device in which the process of assembly, particularly the connection of a clutch element to the housing arrangement, can be simplified.

According to a first aspect of the present invention, this object is met by a hydrodynamic clutch device, particularly a hydrodynamic torque converter or fluid coupling, comprising a housing arrangement, a turbine wheel which is arranged in the housing arrangement so as to be rotatable with respect to the housing arrangement about an axis of rotation, a lockup clutch arrangement by means of which a torque-transmitting connection can be selectively produced between the housing arrangement and the turbine wheel, wherein the lockup clutch arrangement comprises a clutch element which is connected by a connection arrangement to the housing arrangement so as to be substantially fixed with respect to rotation but axially displaceable relative to it, wherein the connection arrangement comprises at least one elastically deformable connection element which is fixedly connected with the housing arrangement on the one hand and with the clutch element on the other hand.

It is further provided according to the invention that the at least one connection element is connected with the housing arrangement in an area between surfaces of a housing element and of a housing hub element which is fixedly connected with the housing element, wherein these surfaces face one another.

Accordingly, since the housing-side connection of the connection element is carried out where a connection of the housing element to the housing hub element must be produced, the process of connecting the three components, for example, can be combined and it is possible to provide two of these components as a preassembled subassembly which is then combined with the other.

For example, it can be provided that the at least one connection element contacts the housing element by a first axial side and contacts the housing hub element by a second axial side and that the housing element is connected with the connection element and housing hub element by welding, preferably by at least one laser weld, or by riveting. A very stable connection which is, at the same time, very simple to produce is provided in this way.

Alternatively, a first circumferential driving arrangement is provided at the at least one connection element, that a second circumferential driving arrangement in a positive-locking driving connection with the first circumferential driving arrangement is provided at the housing hub element and/or at the housing element, and that the housing element is connected with the housing hub element by welding, preferably by at least one laser weld, or by riveting. In this regard, it is advantageous when the first circumferential driving arrangement in the at least one connection element comprises at least one cutout in which the second circumferential driving arrangement, which is preferably formed by deformation, engages, and when the housing element is connected with the housing hub element at least in the area of the second circumferential driving arrangement engaging in the at least one cutout.

According to another alternative constructional variant, the housing hub element can have a surface region located at a distance axially from the housing element and the at least one connection element is connected with the housing hub element in the area of the surface region. In this case, for example, the connection element can be connected with the housing hub element by riveting or welding, preferably by laser welding.

According to another aspect of the present invention, the object stated above is met by a hydrodynamic clutch device, particularly a hydrodynamic torque converter or fluid coupling, comprising a housing arrangement, a turbine wheel which is arranged in the housing arrangement so as to be rotatable with respect to the housing arrangement about an axis of rotation, a lockup clutch arrangement by means of which a torque-transmitting connection can be selectively produced between the housing arrangement and the turbine wheel. The lockup clutch arrangement comprises a clutch element which is connected by a connection arrangement to the housing arrangement so as to be substantially fixed with respect to rotation but axially displaceable relative to it. The connection arrangement comprises at least one elastically deformable connection element which is fixedly connected with the housing arrangement on the one hand and with the clutch element on the other hand, the connection element being constructed in annular shape with a ring body area, wherein connection arm portions proceed from the latter and are fixed to the clutch element or a housing element, the ring body area having body area portions at the two radial sides of the connection arm portions.

In this way, a connection which is very simple to build, but which is very stable at the same time, is provided between the housing arrangement and the clutch element.

For example, the connection arm portions can extend tangential to a circumferential circular line proceeding from the ring body area. Alternatively, the connection arm portions can extend approximately in circumferential direction proceeding from the ring body area.

According to another alternative aspect of the present invention, the object stated above is met by a hydrodynamic clutch device, particularly a hydrodynamic torque converter or fluid coupling, comprising a housing arrangement, a turbine wheel which is arranged in the housing arrangement so as to be rotatable with respect to the housing arrangement about an axis of rotation, a lockup clutch arrangement by means of which a torque-transmitting connection can be selectively produced between the housing arrangement and the turbine wheel, wherein the lockup clutch arrangement comprises a clutch element which is connected by a connection arrangement to the housing arrangement so as to be substantially fixed with respect to rotation but axially displaceable relative to it, wherein the connection arrangement comprises at least one elastically deformable connection element which is fixedly connected with the housing arrangement on the one hand and with the clutch element on the other hand.

In this case, it is further provided that a coupling arrangement is connected with a housing element of the housing arrangement for coupling the housing arrangement with a drive member so as to be fixed with respect to relative rotation by deformation of some areas of the housing element and that the at least one connection element is fixedly connected with the housing element in the area of at least one deformation which is formed for connecting the housing element with the coupling arrangement.

Accordingly, the connection between the housing arrangement and the coupling arrangement as well as the connection between the housing arrangement and the connection element can be produced in one and the same area. This simplifies construction, since the process of assembling three subassemblies can be combined.

For example, the at least one connection element has at least one cutout through which the housing element engages by its deformation and the at least one connection element engages behind its side remote of the housing element.

A very stable connection between the coupling arrangement and the housing element can be achieved when the coupling arrangement engages behind an undercut formed in the area of the deformation of the housing element by a deformed area for connecting the coupling arrangement with the housing element. Further, stability can be increased when the coupling arrangement engages in a cutout of the at least one connection element by a deformed area for connecting the coupling arrangement with the housing element.

Also, in the area of the connection of the at least one connection element to the clutch element, it is preferred for reasons of stability and a simple construction that the at least one connection element has at least one connection arm portion, in which area it is connected with the clutch element, preferably by means of riveting.

According to another alternative aspect of the present invention, the object stated above is met by a hydrodynamic clutch device, particularly a hydrodynamic torque converter or fluid coupling, comprising a housing arrangement, a turbine wheel which is arranged in the housing arrangement so as to be rotatable with respect to the housing arrangement about all axis of rotation, a lockup clutch arrangement by means of which a torque-transmitting connection can be selectively produced between the housing arrangement and the turbine wheel, wherein the lockup clutch arrangement comprises a clutch element.

In this regard, it is further provided that at least one elastically deformable friction surface carrier whose one friction surface is located opposite a counter-friction surface at the housing arrangement is fastened to the housing arrangement and can be acted upon by the clutch element in the direction of the counter-friction surface.

The friction surface carrier which finally also produces a coupling between the housing arrangement and the clutch element is very easy to produce, for example, as a stamped sheet metal part, and obviates the need to provide a friction surface at the clutch element in highly precise manner by deformation or subsequent machining.

In this case, it is preferably provided that the at least one friction surface carrier is connected in a radial inner area with the housing arrangement preferably by riveting and carries, or has, the friction surface in a radial outer area.

In order to enable the transfer of fluids in the interior of the hydrodynamic clutch device, the at least one friction surface carrier has at least one fluid through-opening in an area located radially between its connection with the housing arrangement and the friction surface.

As was already mentioned above, it is advantageous when the at least one friction surface carrier is connected with the clutch element so as to be fixed axially and/or fixed with respect to rotation relative to it. This provides for defined ratios of the moment of inertia in rotary operation.

In this regard, it can be provided that the friction surface carrier is connected in its area radially outside of the fiction surface with the clutch element.

Further, it is advantageous when the friction surface carrier is constructed in an annular disk-shaped manner and is preferably produced from sheet metal material.

According to another aspect of the present invention, the object stated above is met by a hydrodynamic clutch device, particularly a hydrodynamic torque converter or fluid coupling, comprising a housing arrangement, a turbine wheel which is arranged at the housing arrangement so as to be rotatable with respect to the housing arrangement about an axis of rotation, a lockup clutch arrangement by means of which a torque-transmitting connection can be selectively produced between the housing arrangement and the turbine wheel, wherein the lockup clutch arrangement comprises a clutch element.

In this case, it is further provided according to the invention that at least one elastically deformable counter-friction surface carrier whose counter-friction surface is located opposite a friction surface at the clutch element is fastened to the clutch element and can be supported at the housing arrangement when acted upon by the clutch element.

In this case, it is preferably further provided that the counter-friction surface carrier is held at the housing arrangement so as to be fixed with respect to rotation relative to it. For this purpose, the counter-friction surface carrier can have a first driving arrangement which is in a circumferential driving connection with a second driving arrangement at the housing arrangement.

The housing arrangement and the counter-friction surface carrier are preferably connected so as to be fixed with respect to relative rotation radially outside of the counter-friction surface of the counter-friction surface carrier.

According to another aspect of the present invention, an elastic connection element is provided for connecting a clutch element of a lockup clutch arrangement with a housing arrangement of a hydrodynamic clutch device such that the clutch element is substantially fixed with respect to rotation but axially movable relative to the housing arrangement, comprising an annular body area and curved connection arm portions which extend radially outward and in circumferential direction at the annular body area.

It has been shown that an elastic connection element of the type is especially suitable for loads occurring in operation.

In this regard, it is advantageous when the connection arm portions decrease in width proceeding from the body area. Further, the connection arm portions can have a decreasing curvature proceeding from the body area.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
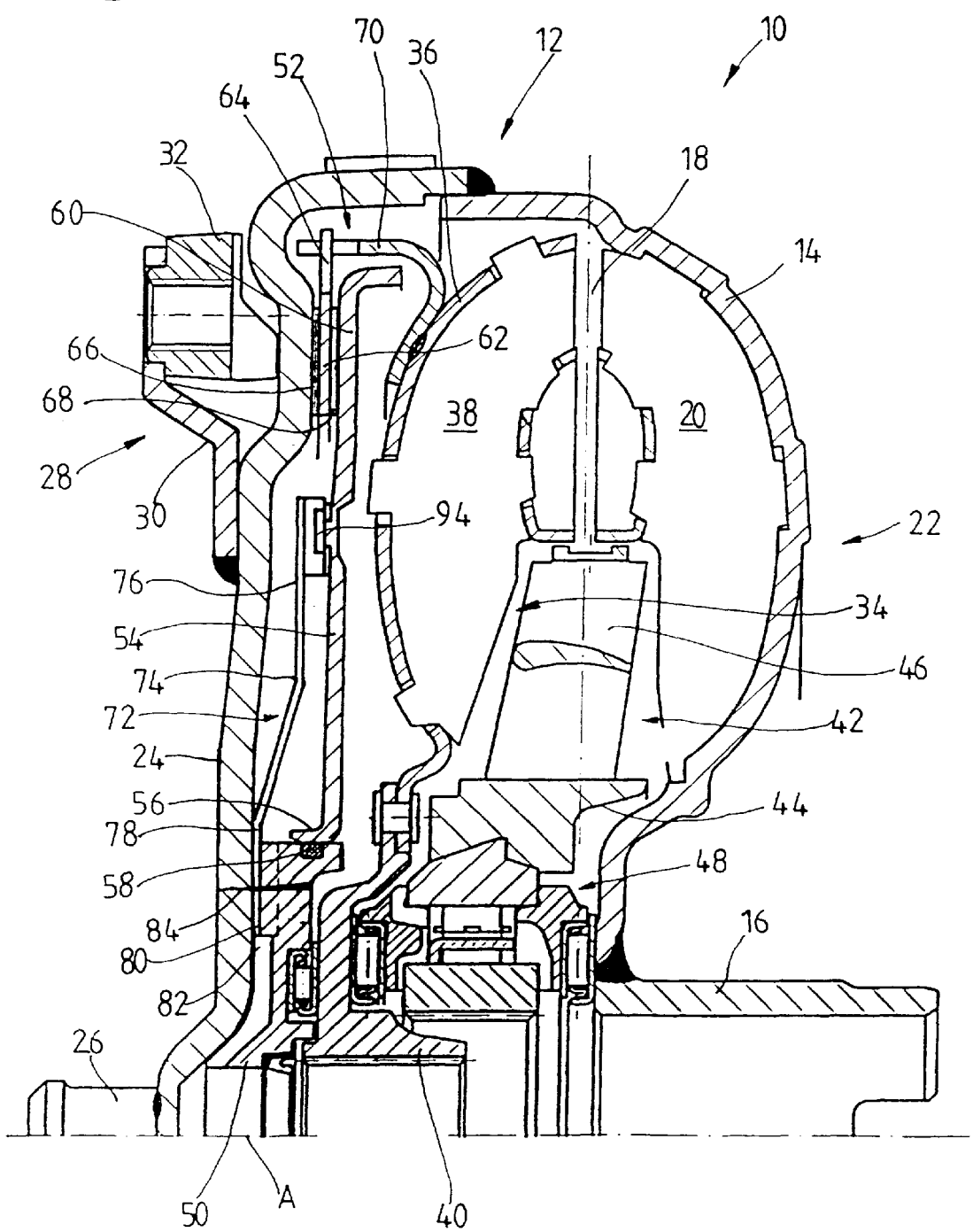
FIG. 1 shows a view in partial longitudinal section through a hydrodynamic clutch device according to the invention in a first embodiment form.

A first embodiment form of a hydrodynamic clutch device according to the invention, in this case using the example of a hydrodynamic torque converter, is described in the following with reference to FIG. 1. The hydrodynamic torque converter 10 comprises a housing arrangement, designated generally by 12. This housing arrangement 12 has an impeller wheel shell 14 which is fixedly connected in a radial inner area with an impeller wheel hub 16, for example, by welding, and carries a plurality of impeller wheel blades 20 at its side facing the interior 18. The impeller wheel shell 14 with its impeller wheel blades 20 and the impeller wheel hub 16 forms an impeller wheel, designated generally by 22.

On the radial outer side, a housing cover 24 is fixedly connected by welding with the impeller wheel shell 14. The housing cover 24 extends radially inward and is fixedly connected on its outer side in its central area close to the axis of rotation A with a bearing pin 26 by connecting or integral construction. This bearing pin 26 call be received in a rotatable manner in a bearing receptacle, not shown, of a drive shaft, for example, a crankshaft, in order to achieve a centering of the torque converter 10 with respect to the drive shaft. Further, a coupling arrangement 28 is provided at the outer side of the housing cover 14, by means of which coupling arrangement 28 the housing arrangement 12 can be connected with said drive shaft, for example, via a flex plate or the like, so as to be fixed with respect to rotation relative to it. This coupling arrangement 28 comprises an annular carrier part 30, for example, which is welded to the housing cover 24 on the one hand and carries a plurality of fastening nuts 32 on the other hand. Screws fastening the flex plate or the like to the housing arrangement 12 can be screwed into these fastening nuts 32.

Further, a turbine wheel 34 is arranged in the interior 18 of the torque converter 10. This turbine wheel 34 comprises a turbine wheel shell 36 which carries a plurality of turbine wheel blades 38 on the side facing the impeller wheel 22. On the radial inside, the turbine wheel shell 36 is fixedly connected with a turbine wheel hub 40, for example, by riveting, wherein a torsional vibration damper can act between these two components where appropriate.

A stator wheel, designated in general by 42, is located axially between the impeller wheel 22 and the turbine wheel 34 in the radial inner area. A plurality of stator wheel blades 46 are arranged on an outer stator wheel ring 44. The outer stator wheel ring 44 is supported, via a freewheel 48, at a supporting element, not shown, for example, a supporting hollow shaft, and is freely rotatable in one rotational direction relative to this supporting element, but is prevented from rotating in the other direction. The stator wheel 42 is supported axially, for example, in the area of the freewheel 48, by bearing arrangements, for example, rolling body bearings or sliding element bearings, at the impeller wheel 22 on one side and at the turbine wheel 34 in the area of the turbine wheel hub 40 on the other side. The turbine wheel hub 40 is in turn supported axially at the other axial side at a housing hub or cover hub 50. This cover hub 50 is arranged at the inner side of the housing cover 24 and, as is described in the following, is connected with the latter.

Further, the torque converter 10 has a lockup clutch arrangement 52. This comprises a clutch piston 54 as a coupling element which is axially movable but connected with the housing arrangement 12 essentially so as to be fixed with respect to rotation relative to it. In its radial inner area, the clutch piston 54 is guided by a cylindrical portion 56 oil an outer circumferential surface of the housing hub 50 so as to be axially movable and tight against liquid with the intermediary of a sealing element 58. Further outward, the clutch element 54 has a friction surface 60 which is located axially opposite to a counter-friction surface 62 at the housing cover 24. A clutch plate 64 with its two friction facings 66, 68 is located between these two surfaces 60, 62. The clutch plate 64 is connected in turn by a driving element 70 with the turbine wheel 34 so as to be fixed with respect to rotation relative to it. Accordingly, it will be seen that there are two surface regions in which a frictional force is generated while the lockup state is being produced or has been produced. Of course, it is possible to provide a plurality of surface pairs of this kind, for example, when a plurality of such plates 64 are connected with the turbine wheel 34, plates which are connected with the housing arrangement 12 so as to be fixed with respect to rotation relative to it being located therebetween.

In order to produce a connection between the clutch piston 54 and the housing arrangement 12 such that they are fixed with respect to relative rotation, a connection arrangement 72 is provided which essentially comprises an elastic connection element 74. This connection element 74 which is constructed, for example, as a sheet metal part or the like, is connected in its radial outer area 76, for example, by riveting, with the clutch piston 54 and is arranged in its radial inner area 78 axially between two surfaces 80, 82 of the housing hub 50 and of the housing cover 24 which are positioned so as to face one another. A fixed connection between the housing hub 50, the connection element 74 and the housing cover 24 is produced by means of a laser weld 84, indicated schematically.

Figure 11:
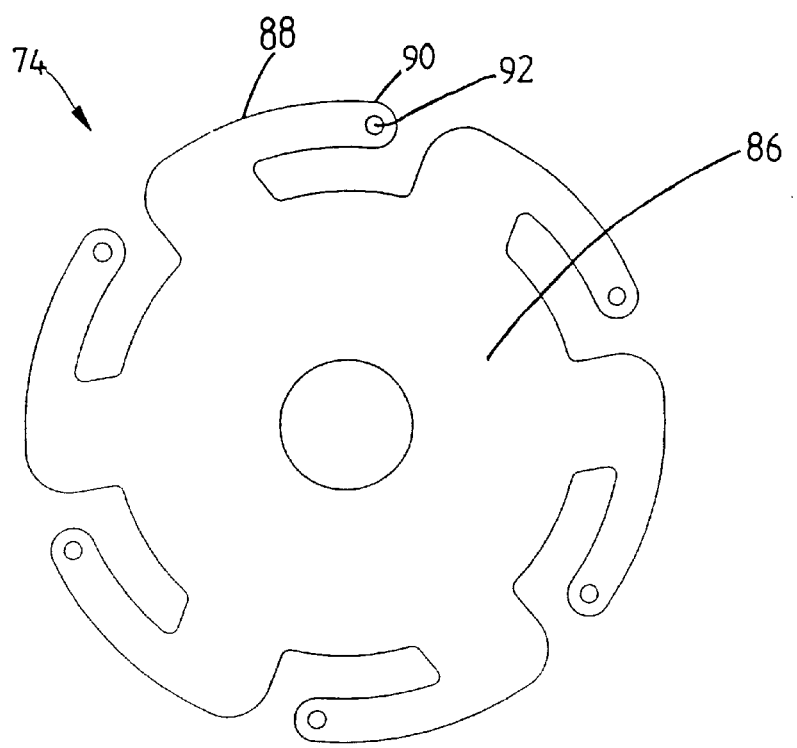
FIG. 11 shows another axial view of a connection element in an alternative construction.

A constructional variant of a connection element 74 of the type mentioned above is shown in FIG. 11. It will be seen that in the radial inner region this connection element 74 has a body area 86 from which individual connection arm portions 88 extend radially outward. These connection arm portions 88 initially proceed approximately radially outward from the body area 86, are then bent and extend essentially in circumferential direction toward their free ends 90. Through-openings 92 through which the rivet elements producing the connection to the clutch piston 54 can extend are provided in the area of these free ends 90. It is noted that these rivet elements can be formed integral with the clutch piston 55 or can also be formed by conventional rivets or blind rivets.

With the body area, the connection element 74 is then arranged, as can be seen from FIG. 1, between the two surface regions 80, 82 which are positioned so as to face one another.

Figure 12:
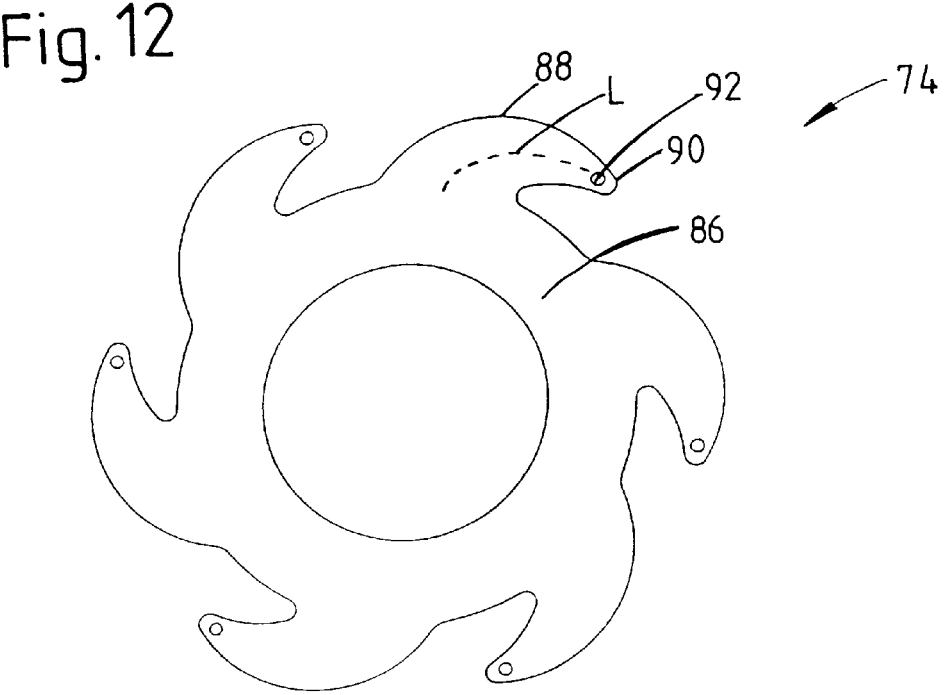
FIG. 12 shows another alternative embodiment form of an elastic connection element.

A modified embodiment form of a connection element 74 of this type is shown in FIG. 12. It will be seen that the connection arm portions 88 curve radially outward and in circumferential direction proceeding from the body area 86. The width of these connection arm portions, for example, measured by the local orthogonal distance from an outer edge of the same to a longitudinal center line L of the same, increases proceeding from the body area 86 to the area of the free end 90. Further, it will be seen that the radius of curvature of these connection arm portions 88, represented, for example, by the radius of curvature of the longitudinal center line L of the same, decreases from the area of the connection with the body area 86. It has been shown that this Construction variant shown in FIG. 12 is constructed so as to absorb the torques and stresses occurring in operation in an outstanding manner, so that local overburdening can be prevented.

Assembly of tile hydrodynamic torque converter 10 shown in FIG. 1, particularly the connection of the clutch piston 54 with the housing arrangement 12, can be carried out in the following manner: First, in a first process step, the clutch piston 54 is connected with the connection element 74, naturally only after these two structural component parts have been prepared in the desired shape, for example, by stamping out of sheet metal and/or deformation. As was already noted, this connection can be carried out, for example, by riveting by means of rivet elements 94 formed integral with the clutch piston 54. In a second process step, the housing cover 24, the preassembled subassembly comprising the clutch piston 54 and connection element 74, and the housing hub 50 are assembled and positioned relative to one another as shown in FIG. 1. In a third process step, the housing cover 24, the connection element 74 in the body area 86 and the housing hub 50 are fixedly connected with one another, for example, by means of an individual laser weld. In this case, it would also be possible to introduce rivet elements and the like. However, the use of a laser weld penetrating all three structural component parts has the advantage that no leakage problems are produced.

It is also noted that a self-evident step consists in that before inserting the clutch piston 54 in the housing cover 24 the plate or plates 64 must also be positioned between these two components. When blind rivets, for example, are used for connecting the connection element 74 with the clutch piston 54, it is also possible for the housing cover 24, the connection element 74 and the housing hub 50 to be placed together first and connected with one another, for example, welded, and then after the plate 64 has been inserted, the clutch piston 54 is attached and riveted with the connection element 74.

Figure 2:
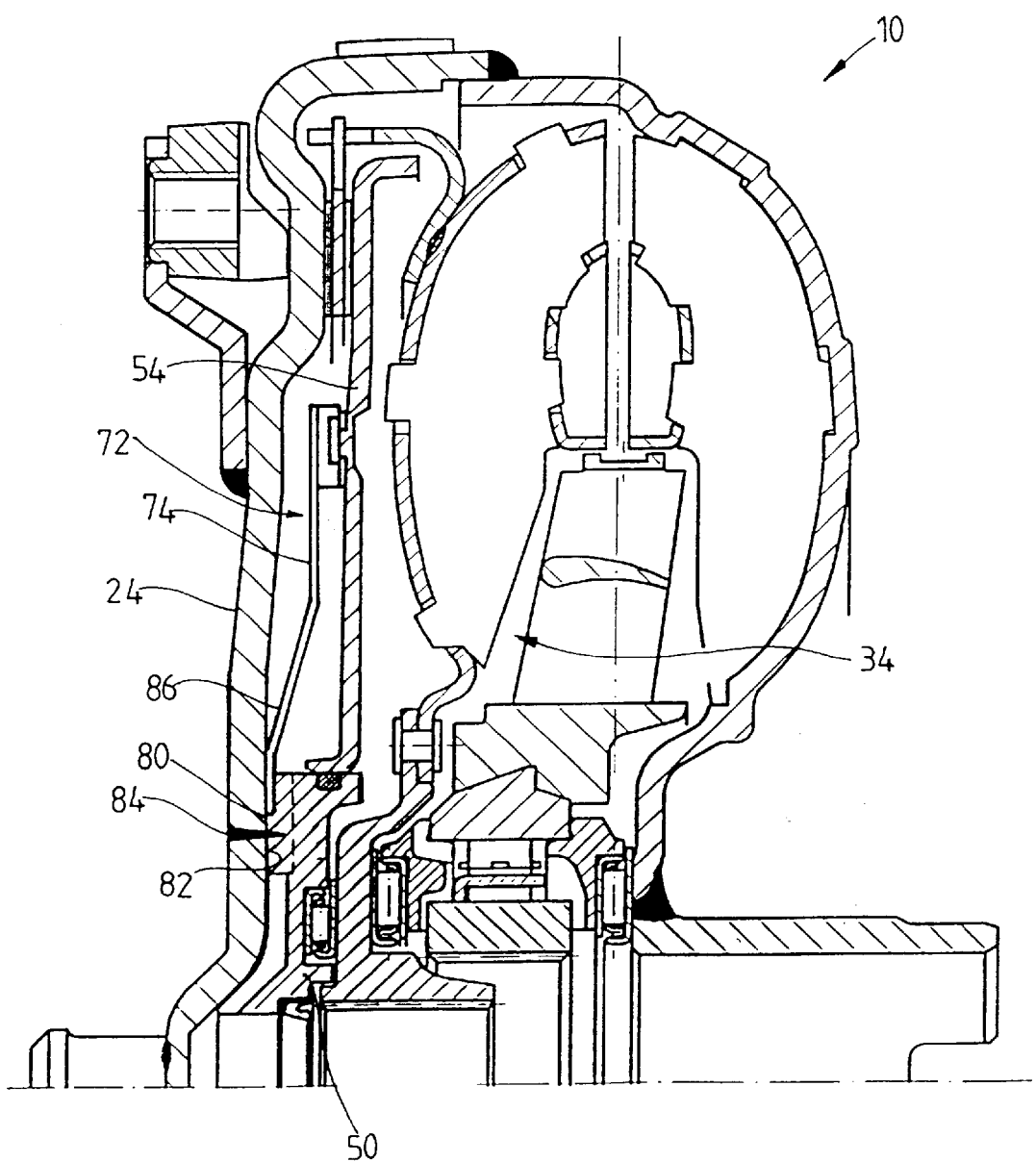
FIG. 2 shows a view in partial longitudinal section through a hydrodynamic clutch device according to the invention in an alternative embodiment form.

A modification of the constructional variant shown in FIG. 1 is shown in FIG. 2. Only the differences pertaining to construction and assembly will be addressed in the following. It will be seen that the connection element 74 is shorter on the radial inside, so that the housing cover 24 and tile housing hub 50 now directly contact one another by their surfaces 82, 80 on the radial inner side of the body area 58. The weld 84 is also formed in this area of direct contact, that is, on the radial inside of the body area 86. During assembly, the connection element 74 is held between the housing cover 24 and the housing hub 50 under axial pretensioning, so that a friction-locking connection is generated. Further, it is possible for the inner circumferential area of the body area 86 to be constructed asymmetrically and for the housing hub 50 to be provided in corresponding manner with an axial shoulder so that a positive-locking connection is also produced between the connection element 74 and the housing hub 50.

In this embodiment form, construction can be carried out in such a way that first the connection element 74 is again connected with the clutch piston 54, for example, by riveting or the like, then this preassembled subassembly is put together with the housing cover 24 and housing hub 50 in a following process step and the housing cover 24 and the housing hub 50 are them welded together while providing the axial pretensioning force mentioned above. If blind rivets are used again for connecting the clutch piston 54 to the connection element 74, then, of course, the clutch piston 54 can also be added in the final process step and riveted with the connection element 74.

It is noted that in order to provide the axial elasticity and to generate the pretensioning force, for example, in an engagement position or release position, the connection element 74, as was already mentioned, can be formed of an elastic sheet metal part, for example, sheet steel, which can be induction-hardened in addition at least in its radial outer area, that is, in the area of the connection arm portions 88. Further, it is noted that in all of the embodiment forms according to the invention an axial stop for the clutch piston 54 can be provided in direction of the turbine wheel 34 in that a retaining ring is provided in the outer circumferential area of the housing hub 50 and engages, for example, in a circumferential groove of the housing hub 50.

Figure 3:
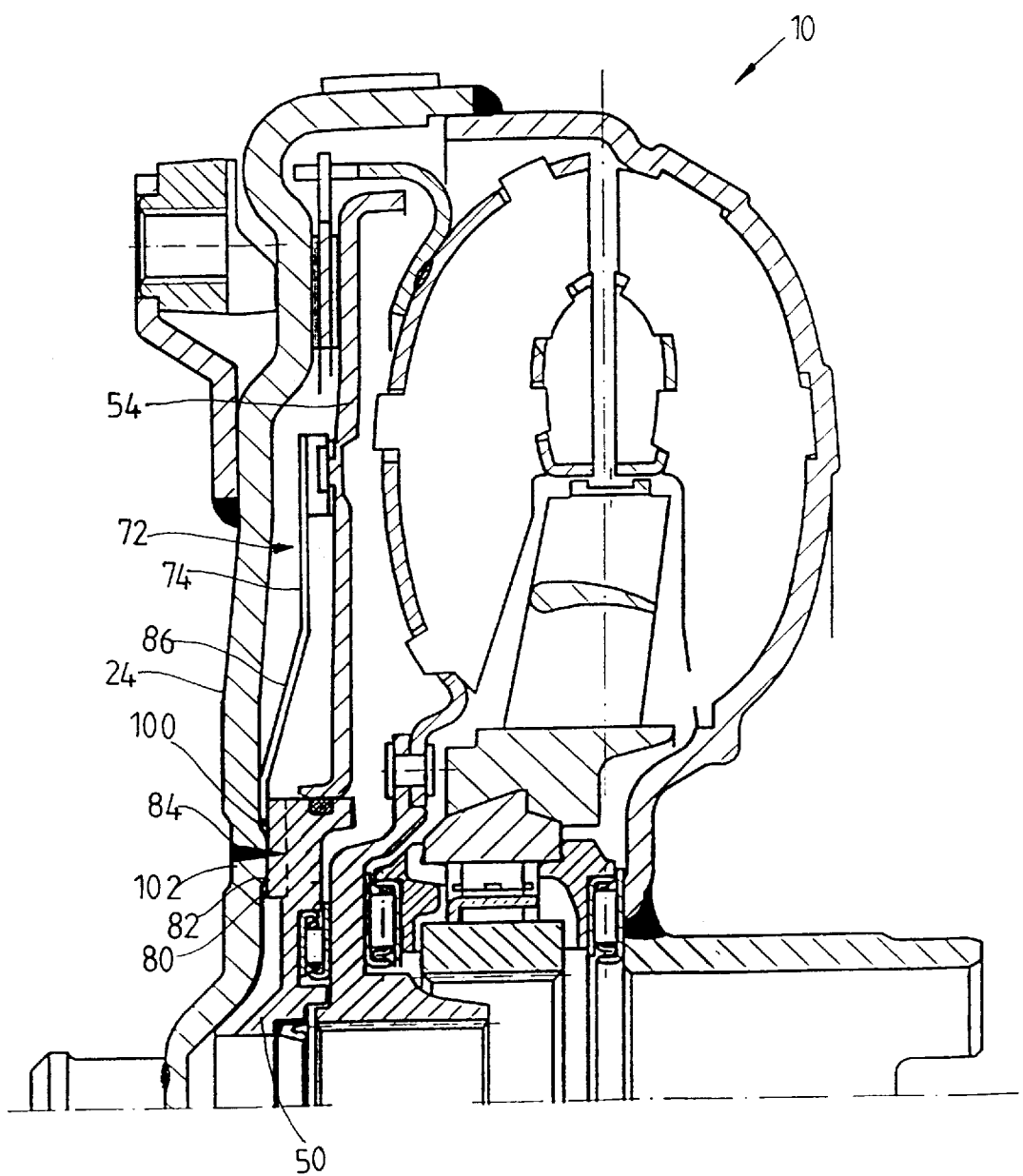
FIG. 3 shows a view in partial longitudinal section through a hydrodynamic clutch device according to the invention in an alternative embodiment form.

FIG. 3 shows another modification of the constructional variant shown in FIG. 1. In the variant shown in FIG. 3, the connection element 74 has, in the body area 86, a plurality of cutouts 100 which are arranged successively in circumferential direction and which can be formed, for example, by openings or by recesses which open radially inward. Protuberances 102 which are formed, for example, in the housing cover 24 by deformation, engage in these cutouts 100 and accordingly produce a positive-locking connection between the connection element 74 and the housing cover 24. Protuberances of this type can also be provided at the housing hub 50. In this case, the housing cover 24 and the housing hub 50 directly contact one another in the area of these protuberances and are welded in this area. The welding can be restricted to this area of direct contact.

In a first process step for manufacturing, a connection is again provided between the connection element 74 and the clutch piston 54; the housing cover 24, the connection element and the housing hub 50 are then positioned against one another and shaped, for example, by pressing. In a third process step, these three parts are connected with one another by a laser weld 84, wherein a material connection is produced preferably only between the housing cover 24 and the housing hub 50, while there is a positive-locking driving connection toward the connection element 74. In this case, also, of course, the piston clutch 54 can again be added and riveted on only after the housing hub 50 has been connected with the housing cover 24. The shaping of the housing cover 24 and/or the housing hub 50 can also be carried out already before joining to the connection element 74.

Figure 4:
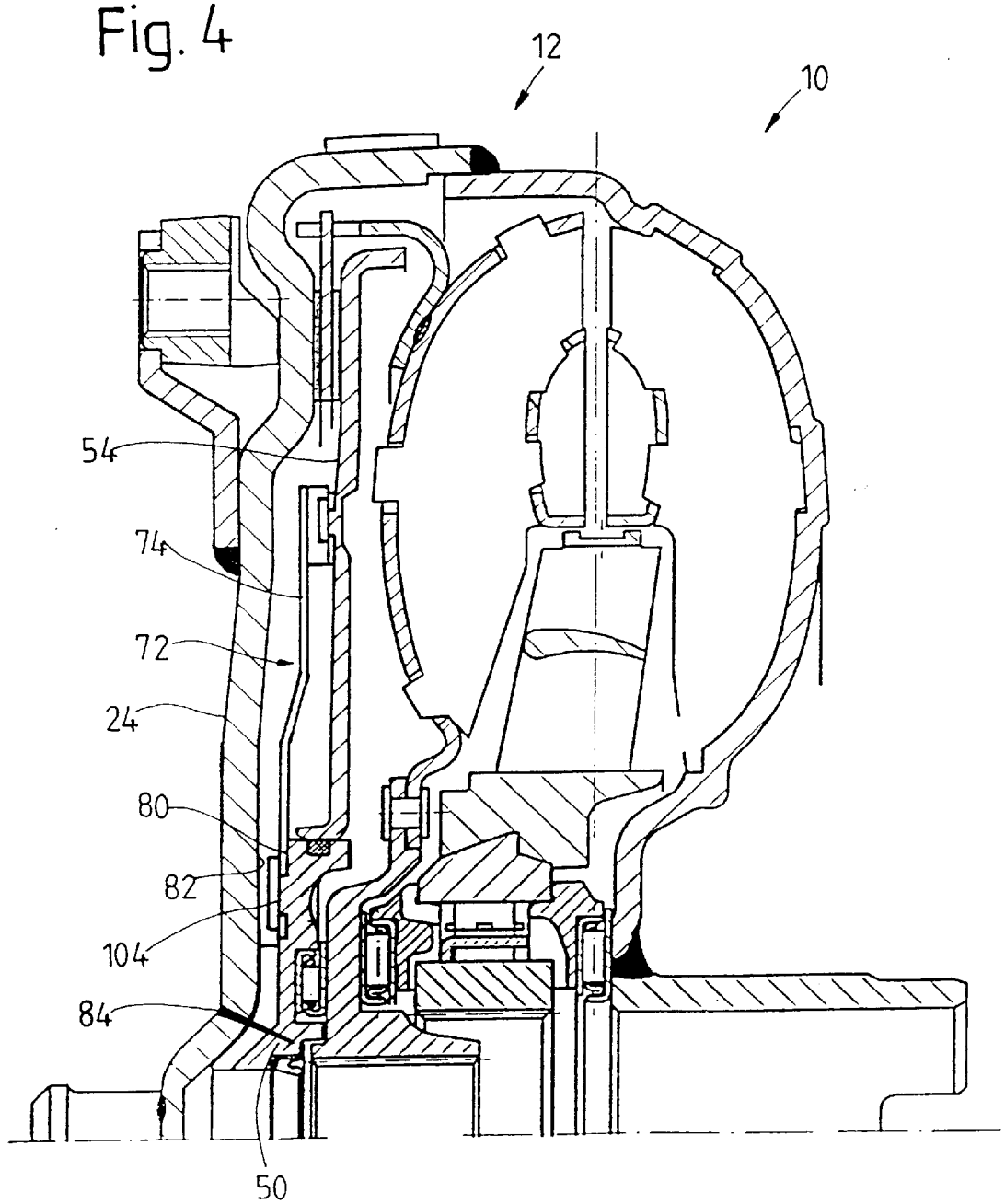
FIG. 4 shows a view in partial longitudinal section through a hydrodynamic clutch device according to the invention in an alternative embodiment form.

FIG. 4 shows another constructional variant in which the connection element 74 is connected with the housing arrangement 12 in the area of two surface regions 80, 82 of the housing hub 50 and housing cover 24, respectively, which surface regions 80, 82 are located axially opposite one another It will be seen in this case that the two surface regions 80, 82 are provided at an axial distance from one another, while the housing hub 50 directly contacts the housing cover 24 only in a radial inner or radial central area and is fastened to the housing cover 24 in that location by welding as is indicated by weld 84. In its surface region 80, the housing hub 50 has rivet elements 104 which are formed, for example, by deformation and which penetrate corresponding openings in the connection element 74 and are then flattened. In this way, a fixed connection is achieved between the connection element 74 and housing hub 50. Manufacture can be carried out in such a way that in a first process step the clutch piston 54 is connected, e.g., riveted, with the connection element 74, whereupon in a second process step this subassembly is fixedly connected with the housing hub 50 by riveting in the area of the rivet elements 104, After this, the housing hub 50, with the arrangement comprising connection element 74 and clutch piston 54 supported thereon, is fitted axially to the housing cover 24 and the connection between these two components is produced, for example, by laser welding. Of course, the clutch piston 54 can also be connected to the connection element 74, especially when using blind rivets, after the weld connection has been produced.

Figure 5:
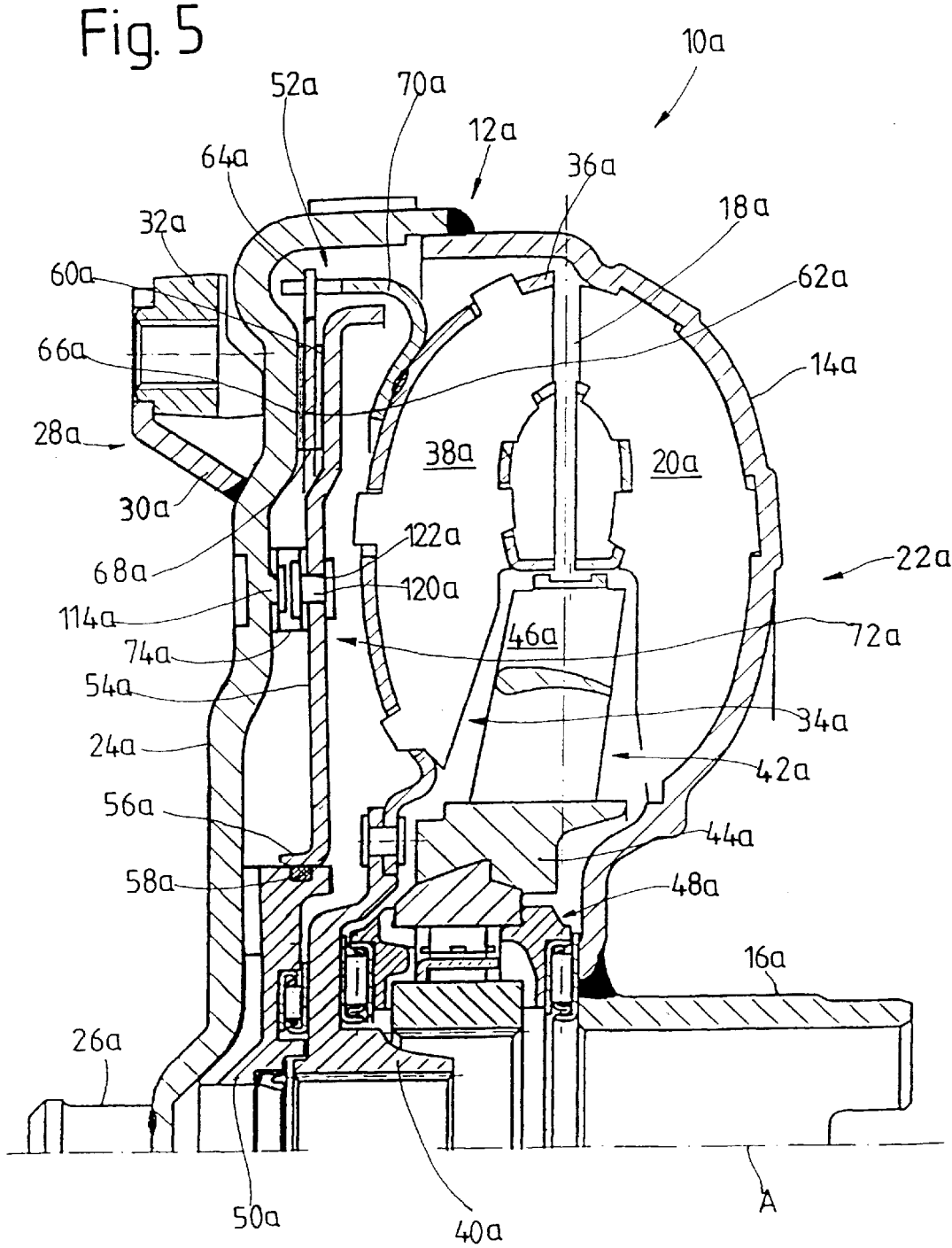
FIG. 5 shows a view in partial longitudinal section through a hydrodynamic clutch device according to the invention in an alternative embodiment form.

FIG. 5 shows all alternative embodiment form of a hydrodynamic clutch device according to the invention. Components corresponding to the components described above with respect to construction or function are designated by the same reference numbers with the addition of the letter "a".

Figure 8:
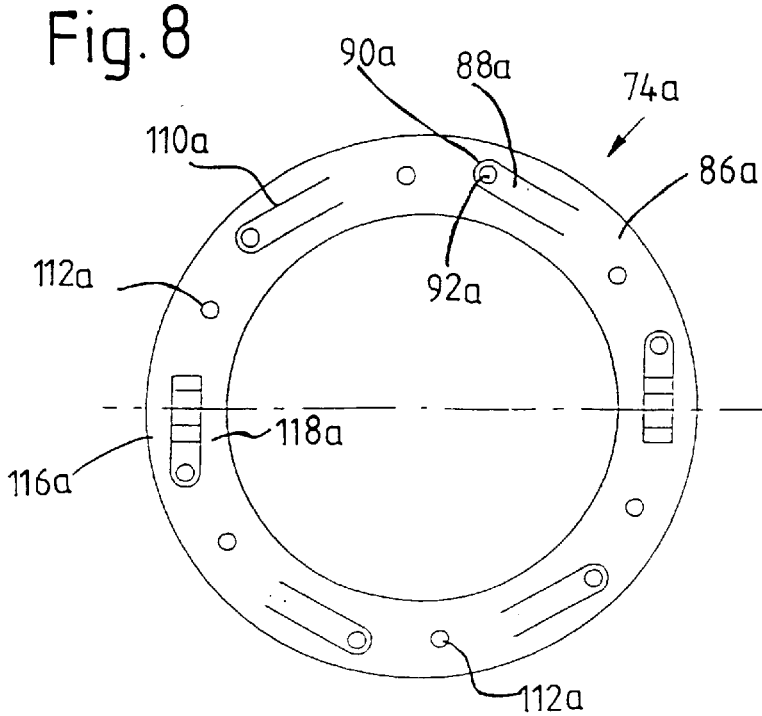
FIG. 8 shows a first embodiment form of an elastic connection element.
Figure 9:
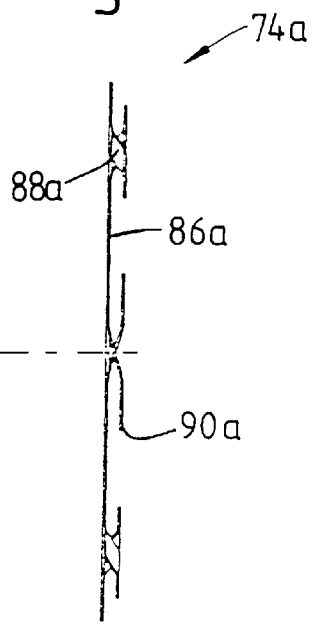
FIG. 9 is a view of the connection element shown in FIG. 8 from the radial outer side.

In the constructional variant shown in FIG. 5, the connection between the clutch piston 54a serving as clutch element and the housing cover 24a is produced in a radial middle area of the same. For this purpose, a connection arrangement 72a with a connection element 74a can be used as is shown, for example, in FIG. 8 and FIG. 9. It will be seen that the connection element 74a has an approximately circular body area 86a in which a plurality of U-shaped grooves 110a are introduced successively in circumferential direction, wherein these U-shaped grooves 110a ultimately provide the connection arm portions 88a connected to the body area 86a in an end area These U-shaped grooves 110a are bent axially as can be seen in FIG. 9 in order to bridge the axial intermediate space between the housing cover 24a and the clutch piston 54a. Material portions 116a, 118a of the body area 86a are located radially inside and radially outside the connection arm portions 88a, so that a configuration of the body area 86a which is closed in circumferential direction at the two radial sides of the connection arm portions 88a is provided along with corresponding stability. Through-openings 112a are provided in the circumferential areas between respective connection arm portions 88a, wherein rivet elements for connecting the connection element 74a to the housing cover 24a can extend through the through-openings 112a. The rivet elements 114a which can be seen in FIG. 5 can be rivet elements for example which are again formed integral with the housing cover 24a, for example, by pressing, and which can be flattened in their head area after they are guided through the openings 112a.

The assembly of this constructional variant can be carried out in such a way that rivet elements are first inserted into the openings 92a for subsequent connection with the clutch piston 54a, namely, In such a way that when a rivet of conventional construction having a head is used, this head faces toward the housing cover 24a. The connection element 74a is then fitted to the housing cover 24a, so that the rivet elements 114a formed at the housing cover 24a can penetrate the openings 112a. These rivet elements are then flattened to achieve the shape shown in FIG. 5. Subsequently, the clutch piston 54a is attached, wherein the rivet elements 120a previously arranged at the connection element 74a then penetrate corresponding openings 122a in the clutch piston 54a. In a further process step, the clutch piston 54a is riveted with the connection element 74a in that the head is supported directly at the housing cover 24a when a riveting tool is applied and the locking head is then formed at the other axial side of the clutch piston 54a. In this riveting process, the elastic deformability of the clutch piston 54a is used to advantage since a slight gap remains after the clutch piston 54a strikes the plate 64a when axial force is applied between the clutch piston 54a and housing cover 24a.

Figure 10:
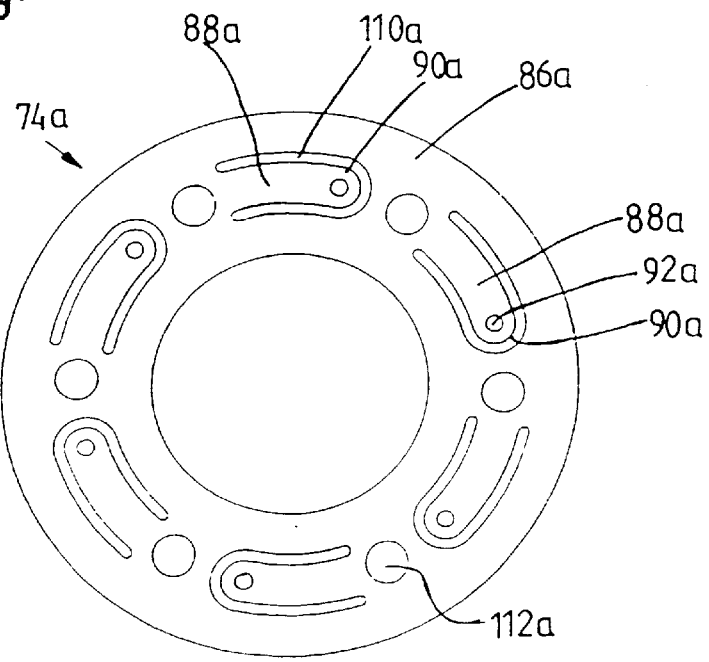
FIG. 10 shows a view corresponding to FIG. 8 of an alternative connection element.

A modified embodiment form of the connection element 74a which can be used in this constructional variant is shown in FIG. 10. It will be seen in this case, in contrast to the constructional variant shown in FIG. 8, that the U-shaped grooves 110a extend in a curved manner in circumferential direction rather than tangentially, so that correspondingly curved connection arm portions 88a are generated.

Figure 6:
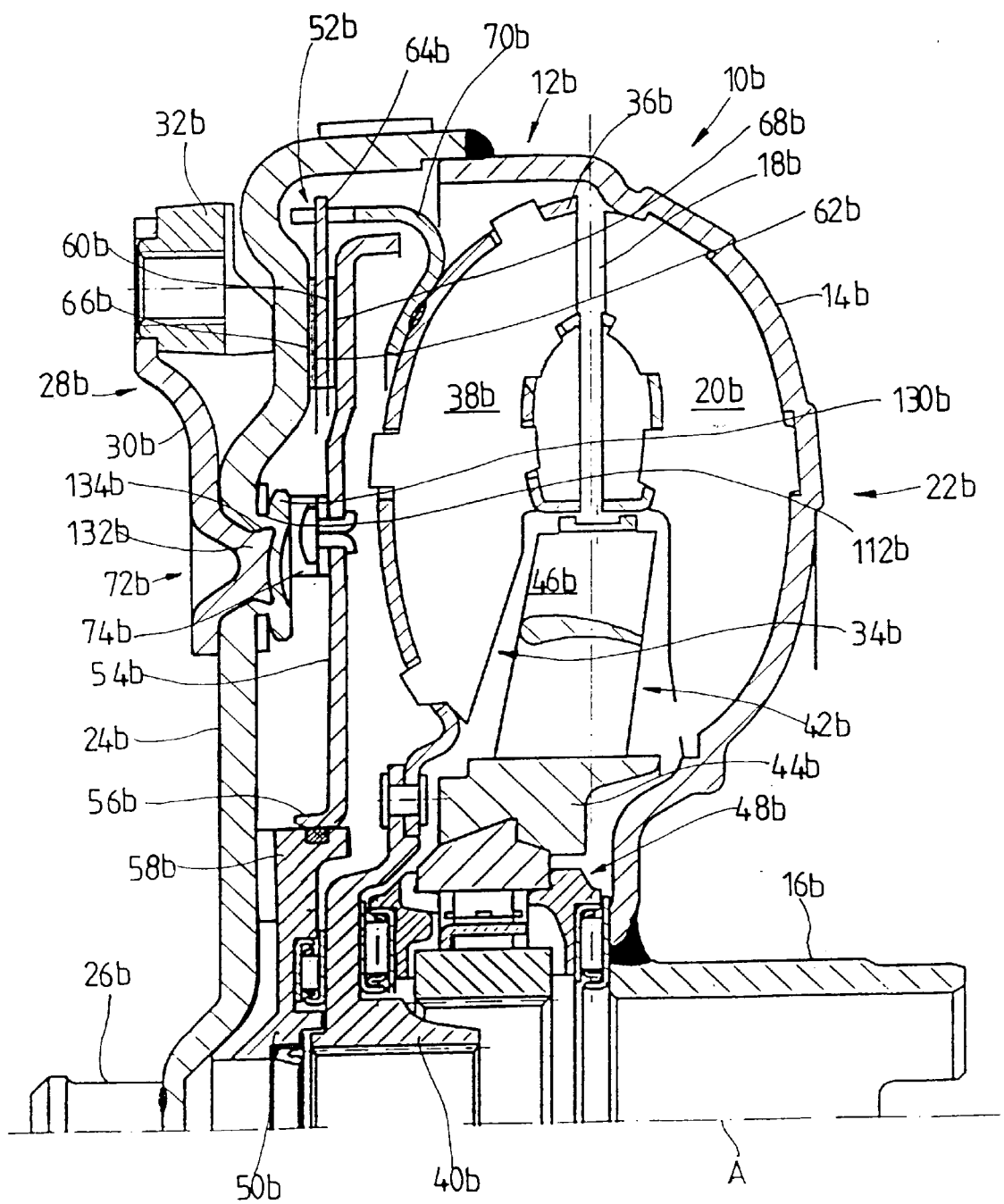
FIG. 6 shows a view in partial longitudinal section through a hydrodynamic clutch device according to the invention in an alternative embodiment form.

Another alternative embodiment form of a hydrodynamic clutch device according to the invention is shown in FIG. 6. Components corresponding to the components described above with respect to construction or function are provided with the same reference numbers with the addition of "b".

It will be seen in FIG. 6 that the connection arrangement 72b is constructed in such a way that a connection between the housing cover arrangement 24b and housing arrangement 12b as well as a connection between the connection element 74b and housing arrangement 12b, especially the housing cover 24b, is generated in the area of the connection arrangement 72b. The connection element 74b can be constructed in the manner shown in FIGS. 8 and 10, wherein the openings 112a preferably have a somewhat larger diameter to make possible the deformation process to be described in the following.

This connection is produced as follows: The housing cover 24b, the carrier 30b and the connection element 74b are first placed axially one on top of another. Subsequently, axial pressing force is generated by applying a tool, by means of which the housing cover 24b is pressed into the openings 112b axially so as to engage behind the connection element 74b on the axial side remote of the housing cover 24 by a material portion 130b having the shape of a rivet head. The carrier 30b then engages in this deformed material area 130b with a head-like material portion 132b which is formed during this deformation process and which engages behind undercuts 134b formed in the material portion 130b. Accordingly, an axially positive-locking connection is also provided between the carrier 30b and the housing cover 24b in this case. These undercuts 134b can initially be generated, for example, first by axial pressing then by caulking the structural component parts. The clutch piston 54b can then be connected, e.g., riveted, with the connection arm portions of the connection element 74b either before or after this connecting process, wherein this can be carried out by the process described with reference to FIG. 5, or blind rivets can be used which are only inserted subsequently and are then deformed.

Figure 7:
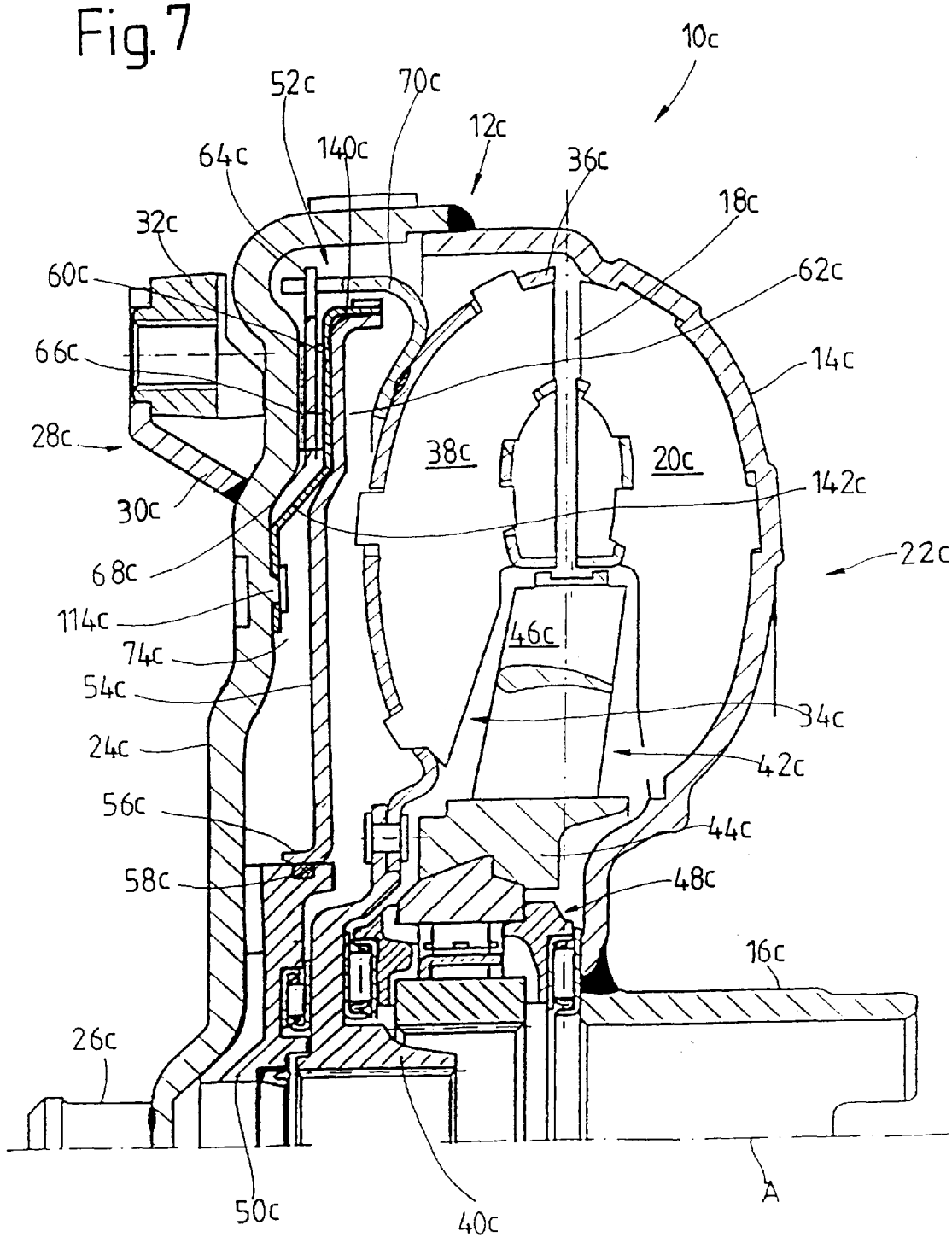
FIG. 7 shows a view in partial longitudinal section through a hydrodynamic clutch device according to the invention in an alternative embodiment form.

Another constructional variant of a hydrodynamic clutch device according to the invention is shown in FIG. 7. Components which correspond to components described above with respect to construction and function are provided with the same reference numbers with the addition of the letter "c".

In the constructional variant shown in FIG. 7, a connection element 74c which simultaneously forms a friction surface carrier and, ultimately, the friction surface 60c is arranged at the housing cover 24c, for example, again by means of rivet elements 114c. This connection element 74c is constructed in disk shape, for example, and is pressed in the cross-sectional configuration shown in FIG. 7. In the radial inner area, the connection is provided at the housing cover 24c, the friction surface 60c is provided in the radial outer area in a portion extending approximately radially and, radially outside of the latter, a connection is produced between the connection element 74c and the clutch piston 54c, for example, in an axially bent cylindrical portion 140c.

In this case, a connection preventing relative rotation is not absolutely necessary, but is advantageous because of the mass inertia of the clutch piston 54c and the relative movement possibly resulting from the latter between the connection element 74c and the clutch piston 54c. This connection can also be achieved, for example, by flexible tongue-like portions which are formed in this area 140c at the sheet metal part and which engage in corresponding recesses in the clutch piston 54c. In this way, an axially fixed connection is achieved between the connection element 74c and the clutch piston 54c, which is also advantageous for preventing excessive movements of the clutch piston 54c toward the turbine wheel 34c. In this case, it is not necessary to provide the above-mentioned retaining elements in the radial inner area.

Since the connection element 74c provides the friction surface 60c in this embodiment form, a correspondingly precise machining of the clutch piston 54c can be dispensed with. This ultimately serves only as a kind of ram or plunger for pressing the radial outer area of the connection element 74c against the plate 64c.

Assembly of this constructional variant can be carried out in such a way that in a flirt process step, after the plate 64c has been inserted again, of course, the connection element 74c is fitted to the housing cover 24c and fixed thereto, for example, riveted to the latter. Subsequently, the clutch piston 54c is inserted axially and connected with the connection element 74c, for example, by means of the above-mentioned teeth which engage in one another, or by means of riveting in the radial outer area or possibly on the radial inside of the friction surface 60c.

It is noted that the connection element 74c can have one or more cutouts 142c to enable a flow of fluid, for example, from the radial outer side to the radial inner side between the housing cover 24c and the clutch piston 54c. It would also be possible to construct the connection element 74c as an annular structural component part only in its radial outer area and then to provide connection arm portions which project radially inward and between which fluid can pass and which are then connected to the housing cover 24c.

Figure 13:
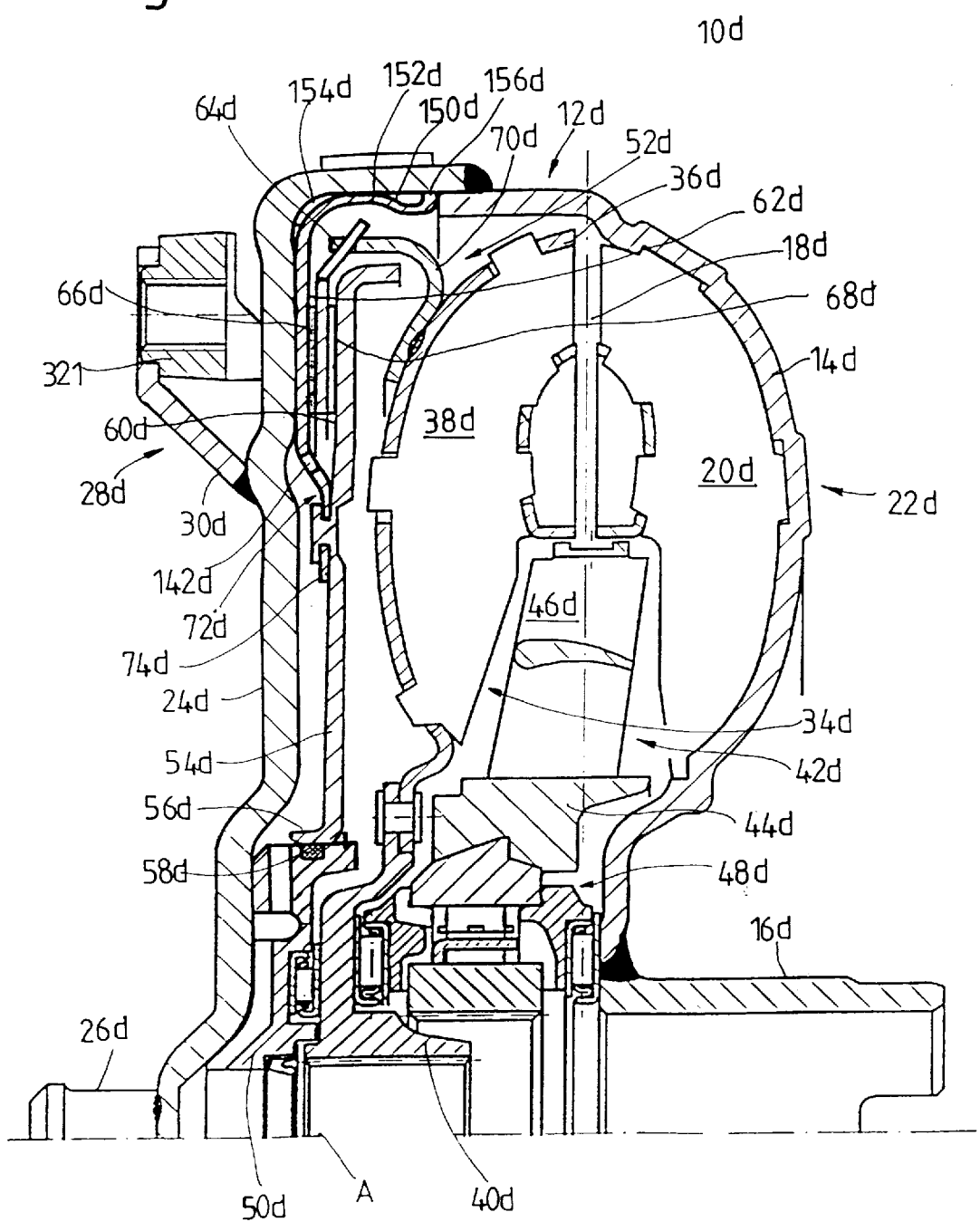
FIG. 13 shows another view in partial longitudinal section of an alternative embodiment form of the hydrodynamic clutch device according to the invention.

FIG. 13 shows a modification of the principle shown in FIG. 7. Components which correspond to components described above with respect to construction and function are provided with the same reference numbers with the addition of the letter "d".

It will be seen in FIG. 13 that the connection arrangement 72d again comprises a connection element 74d which is constructed, for example, in the shape of an annular disk and which is fixed in its radial inner area to the clutch piston 54d, for example, by riveting or the like. This connection element 74d curves away from the clutch piston 54d and extends radially outward and contacts the housing cover 24d in the area of the friction facings 66d, 68d. At the side of this area facing the clutch piston 54d, the connection element 74d has counter-friction surface 62d and accordingly forms a counter-friction surface carrier. The plate 64d with its friction facings 66d, 68d is located axially between this area of the connection element 74d, i.e., the counter-friction surface 62d of the same, and the friction surface 60d at the clutch piston 54d.

The connection element 74d is axially curved on the radial outer side of the counter-friction surface 62d and has in a cylindrical portion 150d a first driving arrangement 152d which is provided, for example, in the form of a plurality of projections which are formed by deformation and which project radially outward or recesses between the latter. A second driving arrangement 154d which can also comprise projections which are likewise formed, for example, by deformation and which project radially inward is provided at the housing cover 24d. When the subassembly formed of clutch piston 54d, connection element 74d and the plate 64d located therebetween is moved on axially, the two driving arrangements 152d, 154d engage one inside the other and accordingly ensure that the clutch piston 54d is held so as to be fixed with respect to rotation relative to the housing arrangement 12d. In order to retain this circumferential driving engagement, an end portion 156d of the connection element 74d constructed in the manner of a flexible tongue is supported axially at the impeller wheel shell 14d, i.e., in the axial end area of the same which engages in the housing cove 24d Therefore, a welded or riveted connection between the connection element 74d and the housing arrangement 12d can be dispensed with.

The connection element 74d again has openings 142d which enable fluid to pass through radially inward, for example, so as not to prevent fluid from flowing radially inward through facing grooves in the friction facings 66d, 68d.

When the fluid pressure prevailing in the volume area formed between the clutch piston 54d and the impeller wheel shell 14d is increased relative to the area formed between the clutch piston 54d and the housing cover 24d, the friction surface 60d of the clutch piston 54d presses against the plate 64d and accordingly acts, via the plate 64d, on the connection element 74d in the area of its counter-friction surface 62d. The connection element 74d which is otherwise constructed in an axially springing or elastic manner is then supported at the housing shell 24d.

It is noted that the friction surface, especially in the embodiment forms according to FIGS. 7 and 13, but also in the other embodiment forms, need not necessarily be provided physically at the clutch piston itself, but can also be arranged, for example, at an element which is rotatable in common with the clutch piston and which can be acted upon axially by the latter. This also means, within the meaning of the present invention, that a friction surface is provided at the clutch piston. This is also true for the counter-friction surface provided at the housing cover.

The various embodiment forms of hydrodynamic clutch devices described above show a construction which is simple to produce and which operates in a stable manner at the same time, particularly by the manner in which the clutch piston is connected with the housing arrangement so as to be fixed with respect to rotation relative to it. Finally, it is noted that the supply and discharge of fluid in hydrodynamic clutch devices of this type can, of Course, be carried out in the manner known from the prior art. For example, fluid supply can be carried out in the area between the clutch piston and the impeller wheel shell and fluid can be discharged from this spatial area and also from the spatial area between the housing cover and the clutch piston, wherein fluid channels extending from the radial inside to the radial outside are provided in the housing hub, for example, or are provided in connection with the housing cover in order to enable the passage of fluid. The friction facings of the plate or plates can be provided with facing grooves which also make it possible for fluid to pass through in the engaged state of the lockup clutch arrangement. Further, it is possible to provide a plurality of throttle openings in the clutch piston itself, which enable the above-mentioned transfer of fluid.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

We claim:

1. A hydrodynamic clutch device, comprising:

a housing, said housing having a housing cover;

a turbine wheel;

a hub for supporting the turbine wheel for rotation about an axis within said housing;

a lockup clutch for selectively effecting a torque-transmitting connection between said housing cover and said turbine wheel, said lockup clutch including a clutch element; and an elastically deformable connection element for connecting said clutch element to said housing cover such that said clutch element is fixed against rotation but axially displaceable relative to said housing cover, said connection element including:

an annular shaped body area; and connection arm portions, each connection arm portion including a proximal end, a distal end, a central portion, and an arm portion longitudinal centerline, said proximal end joined to said body area, said arm portion longitudinal centerline being substantially curvilinear, said distal end extending along a circumference relative to said annular shaped body area, said central portion connecting said proximal and distal end, said connection arm portions being fixed to at least one of said clutch element and said housing cover.

2. The hydrodynamic clutch device of claim 1, wherein said central portion of said connection arm portions are formed so that a width of said connection arm portions increases toward said proximal end.

3. The hydrodynamic clutch device of claim 1, wherein said arm portion longitudinal centerline is defined by a radius of curvature that decreases from said proximal end to said distal end.

4. The clutch device of claim 1, herein said clutch element comprises a piston of said lockup clutch.

5. The clutch device of claim 1, wherein said connection arms are axially bent so that said clutch element is held at an axial distance from said housing cover at a non-loaded position of said connection arm portions.

6. The clutch device of claim 1, wherein said clutch element includes rivet elements formed integrally therewith, said connection element being connected to said clutch element by said rivet elements.

7. The clutch device of claim 6, wherein said annular shaped body area is connected to said housing cover by welding.

8. The clutch device of claim 6, wherein said annular shaped body area is connected to said housing cover by further rivets.

9. The clutch device of claim 1, wherein said housing cover comprises rivet elements formed integrally therewith, said connection element being connected to said housing cover by said rivet elements.

10. The clutch device of claim 1, wherein said body area has body area portions at each of opposite radial sides of said connection arm portions.

* * * * *